United States Patent [19]

Kuchinsky, Jr.

[11] Patent Number: 4,659,142
[45] Date of Patent: Apr. 21, 1987

[54] COMBINATION BEACH CADDY AND BEACH CHAIR

[76] Inventor: Peter Kuchinsky, Jr., 15 Stuart Dr., Syosset, N.Y. 11791

[21] Appl. No.: 868,523

[22] Filed: May 30, 1986

[51] Int. Cl.⁴ ............................................. A47B 85/04
[52] U.S. Cl. .................. 297/118; 280/41.25; 297/129
[58] Field of Search .......................... 5/417, 420, 432; 297/129, 130, 118; 280/645, 47.32, 47.24, 47.25

[56] References Cited

U.S. PATENT DOCUMENTS

| | | | |
|---|---|---|---|
| 2,967,058 | 1/1961 | Hoffmann, Jr. | 297/130 X |
| 3,285,654 | 11/1966 | Cramer | 297/129 X |
| 3,997,213 | 12/1976 | Smith et al. | 297/118 |
| 4,208,070 | 6/1980 | Geschwender | 5/432 |
| 4,323,260 | 4/1982 | Suchy | 280/47.25 |
| 4,376,547 | 3/1983 | Dominko | 297/118 X |
| 4,533,151 | 8/1985 | Maitland | 297/118 X |

Primary Examiner—James T. McCall
Attorney, Agent, or Firm—Michael I. Kroll

[57] ABSTRACT

A combination beach caddy and beach chair unit that consists of a first web extending between arms of a first elongated U-shaped frame member. A pair of rollers are rotatably mounted on an axle extending between distal ends of the arms of the first U-shaped frame member. A second web extends between arms of a second U-shaped frame member which are secured at distal ends thereof transversely to the arms of the first U-shaped frame member between the first web and the axle.

3 Claims, 2 Drawing Figures

COMBINATION BEACH CADDY AND BEACH CHAIR

BACKGROUND OF THE INVENTION

1. Field of the Invention

The instant invention relates generally to roller assemblies and more specifically it relates to a combination beach caddy and beach chair.

2. Description of the Prior Art

Numerous roller assemblies have been provided in prior art that are adapted to move articles over land surfaces. For example, U.S. Pat. Nos. 2,406,169; 3,054,622; 3,306,624 and 3,333,861 all are illustrative of such prior art. While these units may be suitable for the particular purpose to which they address, they would not be as suitable for the purposes of the present invention as heretofore described.

SUMMARY OF THE INVENTION

A primary object of the present invention is to provide a combination beach caddy and beach chair that will overcome the shortcomings of the prior art devices.

Another object is to provide a combination beach caddy and beach chair that in one instance can be used to transport beach articles across the surface of a beach or pavement and in another instance can be converted into a chair so that a person can sit in the chair on the beach.

An additional object is to provide a combination beach caddy and beach chair that is fabricated out of lightweight and durable material so that a person using the unit will have no difficulty in doing so.

A further object is to provide a combination beach caddy and beach chair that is simple and easy to use.

A still further object is to provide a combination beach caddy and beach chair that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
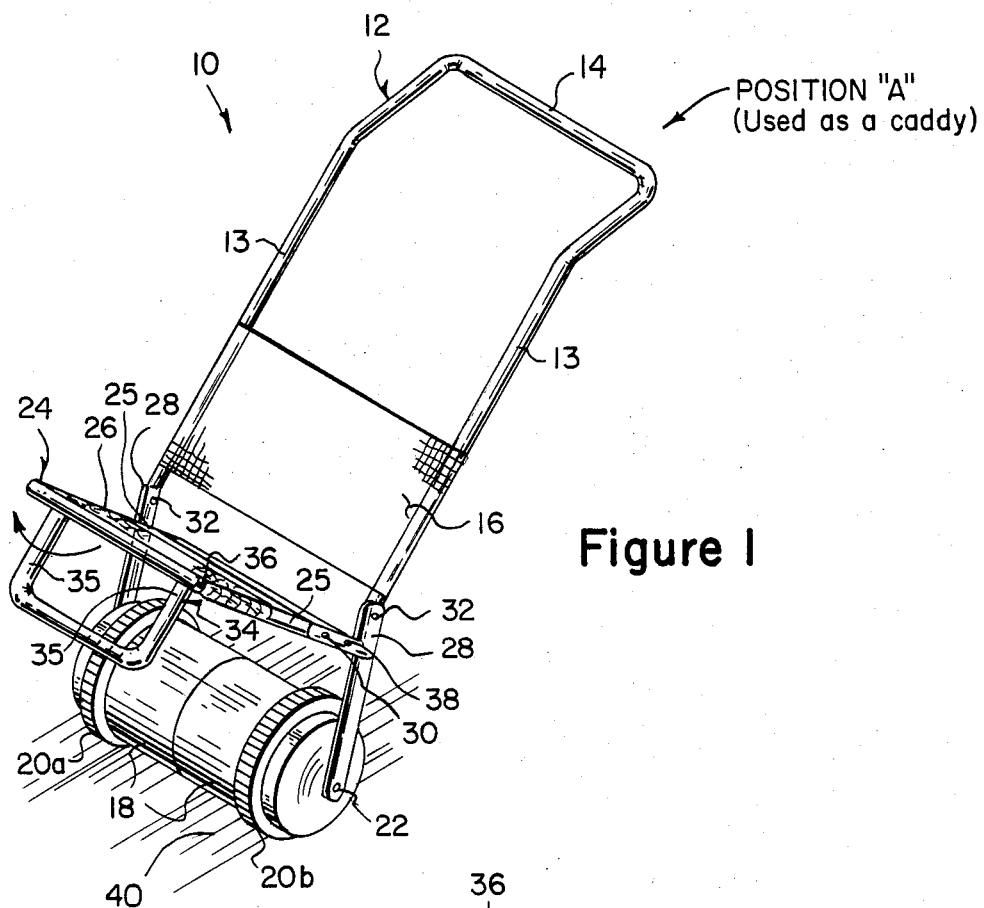
FIG. 1 is a perspective view of the invention used as a beach caddy.
Figure 2:
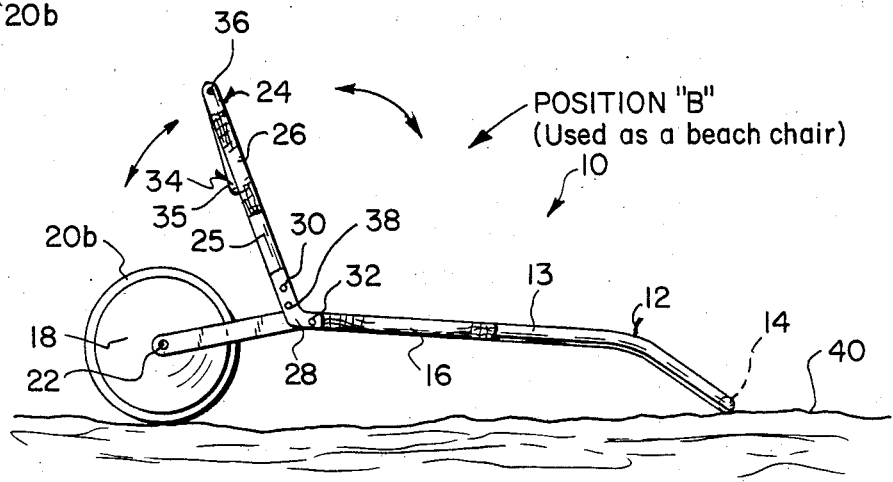
FIG. 2 is a side view thereof wherein the invention is used as a beach chair.

Turning now descriptively to the drawings, in which similar reference characters denote similar elements throughout the several views, FIGS. 1 and 2 illustrates a combination beach caddy and beach chair unit 10 that consists of a first elongated U-shaped frame member 12 that has a pair of spaced apart arms 13 and a handle portion 14. A first web 16 extends between the arms 13 of the first U-shaped frame member 12. An axle 22 extends between distal ends of the arms 13 of the first U-shaped frame member 12. A pair of rollers 18 are retractably mounted on the axle 22. A second U-shaped frame member 24 that has a pair of spaced apart arms 25 are secured at distal ends thereof transversely to the arms 13 of the first U-shaped frame member 12 between the first web 16 and the axle 22.

A second web 26 extends between the arms 25 of the second U-shaped frame member 24. When the unit 10 is used as the beach caddy, as shown in FIG. 1, position "A", an article to be transported (not shown) is supported between the first and second webs 16 and 26. A person (not shown) can grip and pull the handle portion 14 allowing the rollers 18 to travel over sand 40. When the unit 10 is used as the beach chair, as shown in FIG. 2, position "B", the first U-shaped frame member 12 is tipped downwardly allowing the handle portion 14 to make contact with the sand 40. The person can now sit upon the first web 16 with the second web 26 acting as a backrest for the person.

A pair of annular protrusion members 20a and 20b are also provided. Each is affixed to circumference of one of the rollers 18 to increase traction and prevent seeway movement when the rollers 18 travel over the sand 40 and also provides a quiet tire tread action on pavement.

The unit 10 further contains a pair of L-shaped brackets 28. Each are secured at rivet 30 to the distal end of one of the arms 25 of the second U-shaped frame member 24 and is pivotly affixed at pivot pin 32 to one of the arms 13 of the first U-shaped frame member 12 between the first web 16 and the axle 22. A rod 38 extends between and is affixed to the L-shaped brackets 28 so that the second U-shaped frame member 24 can be held in position when in use and flipped towards the first U-shaped frame member 12 when the unit 10 is being stored.

A third U-shaped frame member 34 has a pair of spaced apart arms 35 pivotly affixed by pivot pins 36 to the second U-shaped frame member 24 opposite the L-shaped brackets 28. The third U-shaped frame member 34 can be pulled down, as shown in FIG. 1, to rest upon the sand 40. When the unit 10 is used as the beach caddy and pushed up, as shown in FIG. 2, when the unit 10 is used as the beach chair. The first web 16 and the second web 26 are both fabricated out of fabric material such as canvas or the like.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A combination beach caddy and beach chair unit comprising:
    (a) a first elongated U-shaped frame member having a pair of spaced apart arms and a handle portion;
    (b) a first web extending between said arms of said first U-shaped frame member;
    (c) an axle extending between distal ends of said arms of said first U-shaped frame member;
    (d) a pair of rollers rotatably mounted on said axle;
    (e) a second U-shaped frame member having a pair of spaced apart arms secured to distal ends thereof transversely to said arms of said first U-shaped frame member between said first web and said axle;

(f) a second web extending between said arms of said second U-shaped frame member so that when said unit is used as said beach caddy an article to be transported is supported between said first and second web in which a person can grip and pull said handle portion allowing said rollers to travel over sand and when said unit is used as said beach chair, said first U-shaped frame member is tipped downwardly allowing said handle portion to make contact with said sand so that said person can sit upon said first web with said second web acting as a backrest for said person;

(g) a pair of annular protrusion members, each of which is affixed to circumference of one of said rollers to increase traction and prevent sea saw movement when said rollers travel over said sand and pavement;

(h) a pair of L-shaped brackets, each secured to said distal end of one of said arms of said second U-shaped frame member and pivotally attached to one of said arms of said first U-shaped frame member between said first web and said axle; and (i) a rod extending between and affixed to said L-shaped brackets so that said second U-shaped frame member can be held in position when in use and flipped towards said first U-shaped frame member when said unit is being stored.

2. A combination beach caddy and beach chair as recited in claim 1, further comprising a third U-shaped frame member having a pair of spaced apart arms pivotly affixed to said second U-shaped frame member opposite said L-shaped brackets in which said third U-shaped frame member can be pulled down to rest upon said sand when said unit is used as said beach caddy and pushed up when unit is used as said beach chair.

3. A combination beach caddy and beach chair as recited in claim 2, wherein said first web and said second web are fabricated out of fabric material.

* * * * *